July 11, 1939.  B. G. CARLSON  2,165,451
SERVOMOTOR SYSTEM FOR AIRCRAFT
Filed March 20, 1936   3 Sheets-Sheet 1

INVENTOR
BERT G. CARLSON
BY
Herbert H. Thompson
HIS ATTORNEY

July 11, 1939.   B. G. CARLSON   2,165,451
SERVOMOTOR SYSTEM FOR AIRCRAFT
Filed March 20, 1936    3 Sheets-Sheet 2
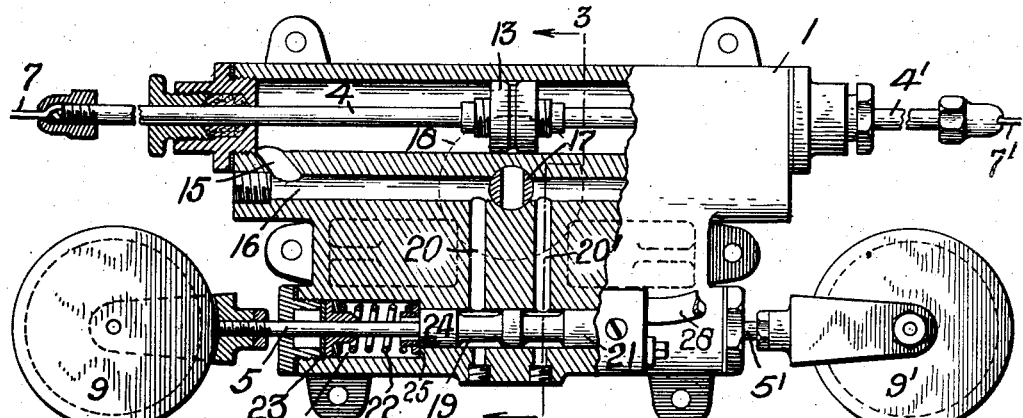
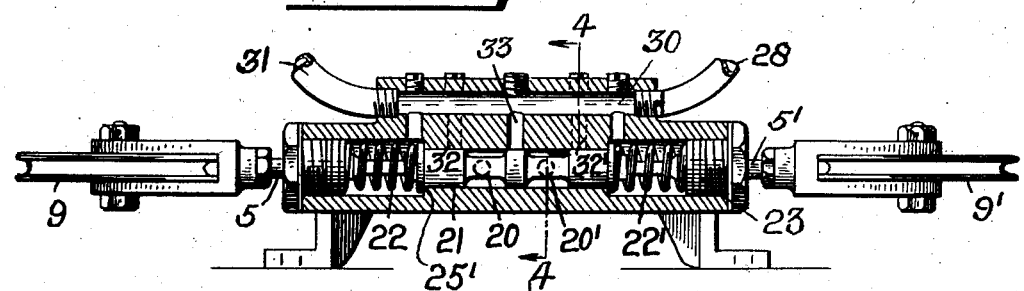
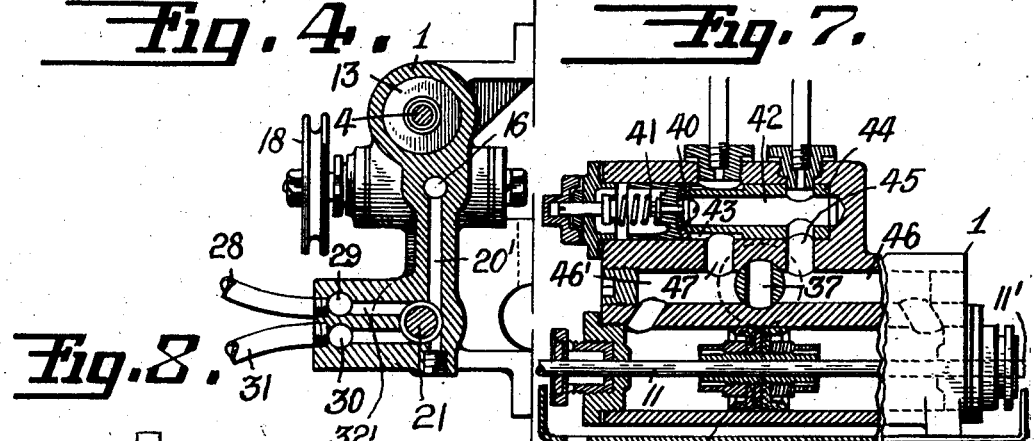
INVENTOR
BERT G. CARLSON
BY
Herbert H. Thompson
HIS ATTORNEY.

July 11, 1939.   B. G. CARLSON   2,165,451
SERVOMOTOR SYSTEM FOR AIRCRAFT
Filed March 20, 1936   3 Sheets-Sheet 3
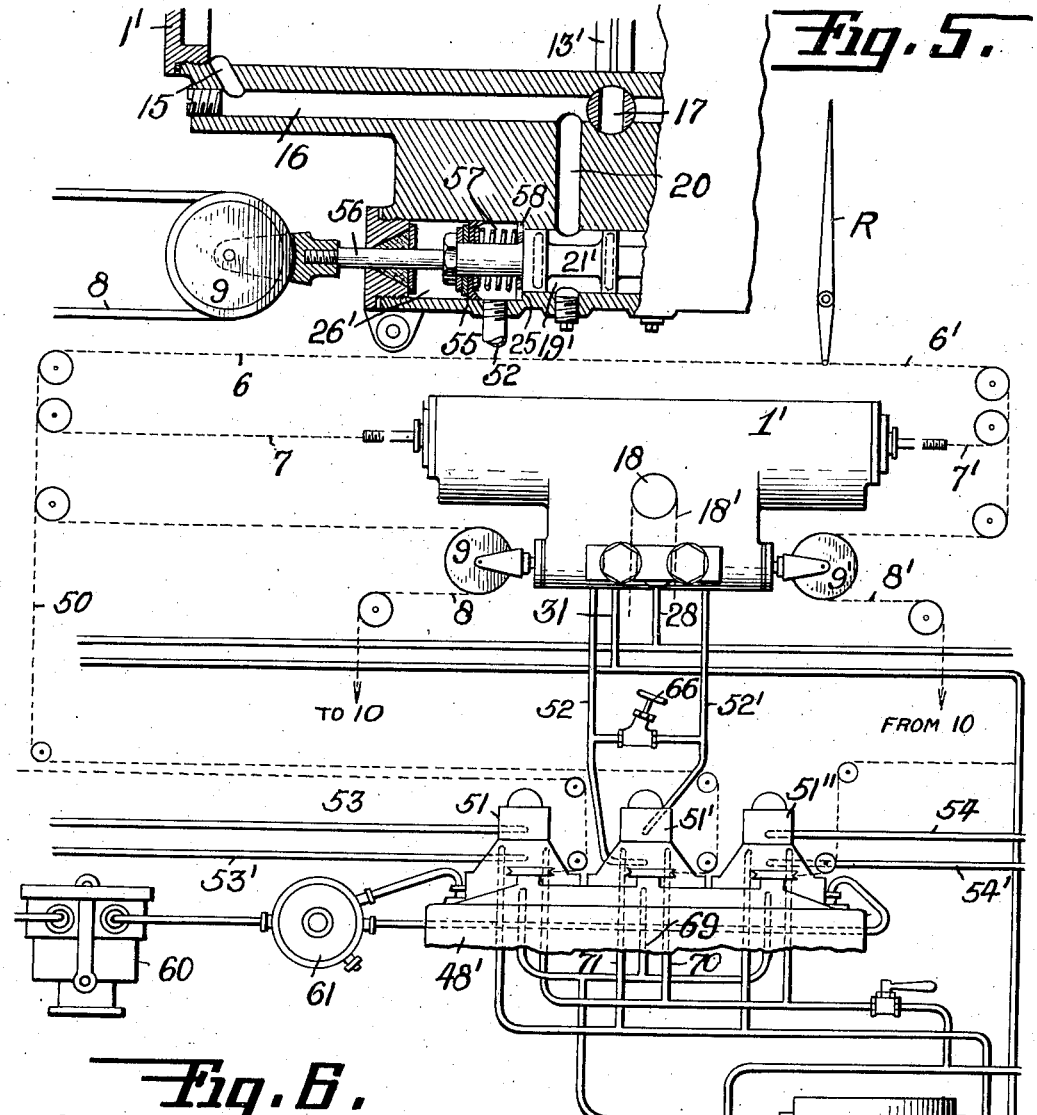
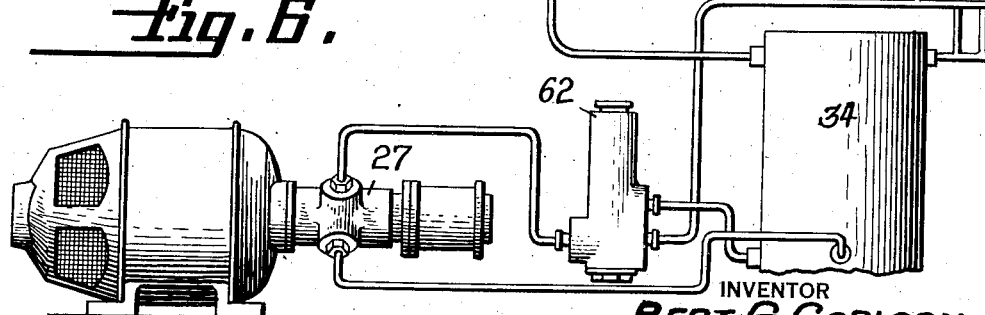
INVENTOR
BERT G. CARLSON
BY
Herbert H. Thompson
HIS ATTORNEY.

Patented July 11, 1939

2,165,451

UNITED STATES PATENT OFFICE 2,165,451

SERVOMOTOR SYSTEM FOR AIRCRAFT

Bert G. Carlson, Bellerose, N. Y., assignor to Sperry Gyroscope Company, Inc., Brooklyn, N. Y., a corporation of New York Application March 20, 1936, Serial No. 69,757

4 Claims. (Cl. 244—78)

This invention relates to servo motor control for large aircraft, in which mechanical aid is necessary to assist the pilot in moving the control surfaces. In very large aircraft, the pull required to move the control surfaces becomes more than can be readily handled by man power and it becomes of importance to supply a power actuated servo system to operate the control surfaces. The automatic pilot for aircraft may be fitted readily into such a servo system, either by operating the large servo motors directly from the control unit of the automatic pilot or indirectly from the standard servo motors supplied with the pilot.

Referring to the drawings, disclosing several forms my invention may assume,

Fig. 1 is a diagrammatic view of the servo motor system, with a standard automatic pilot coupled into the same.

Fig. 1—A is a sectional detail of one of the pneumatically operated control valves of the control unit of the automatic pilot.

Fig. 2 is a transverse section, on a larger scale, of one of the heavy duty servo motors.

Fig. 3 is a section taken approximately on broken line 3—3 of Fig. 2.

Fig. 4 is a section taken approximately on broken line 4—4 of Fig. 3.

Fig. 5 is a partial section of a modified form of servo motor for use in the form of the invention shown in Fig. 6.

Fig. 6 is a diagrammatic view of a modified form of the invention, in which only one system of servo motors is employed.

Fig. 7 is a vertical section through one of the automatic pilot servo motors used in Fig. 1.

Fig. 8 is a detail of Fig. 5.

Figures 1, 1A:
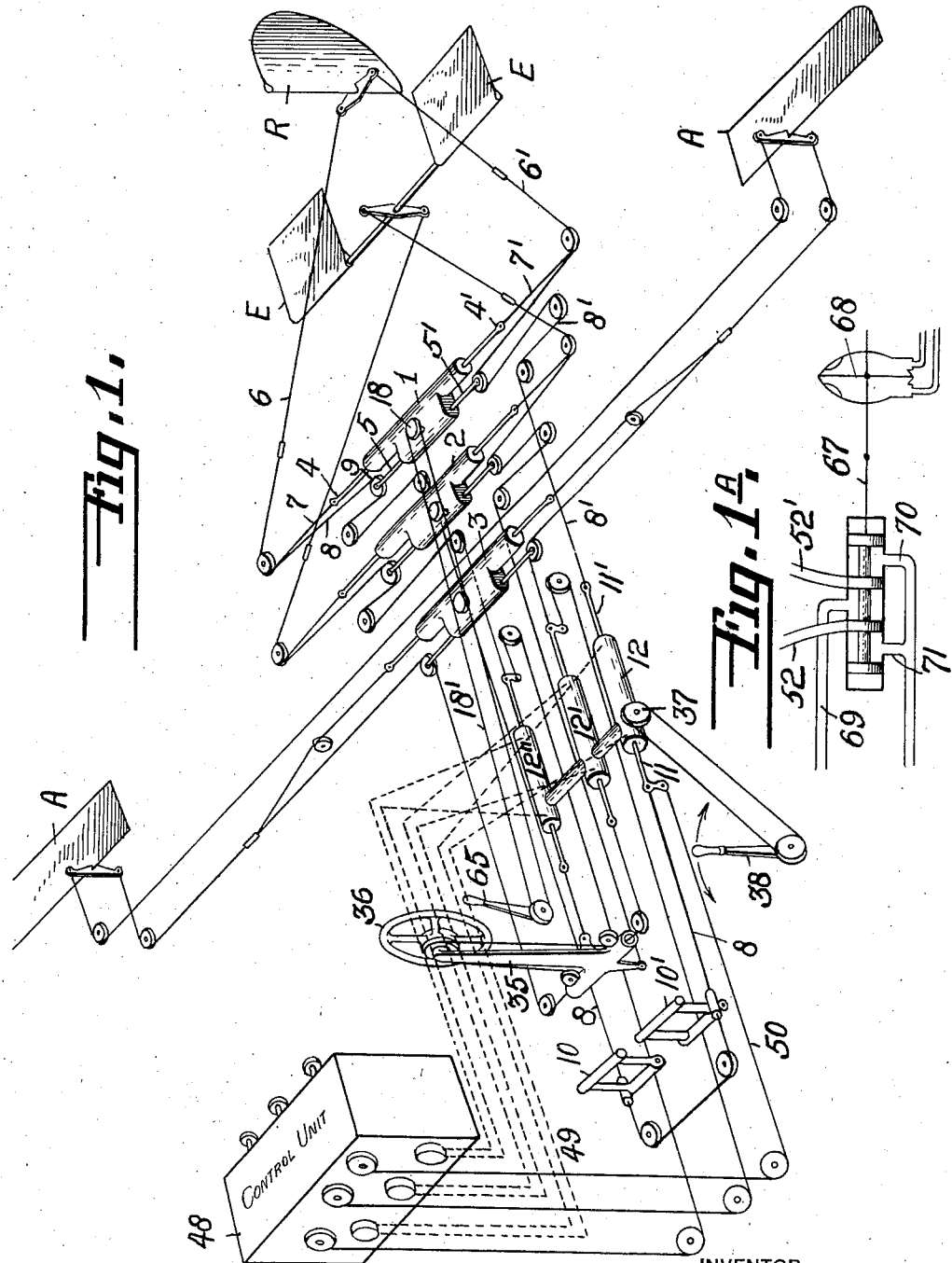

In the plane diagrammatically shown in Fig. 1, the control surfaces are of a large size, requiring a greater force to move than can be exerted by a pilot. Since the automatic or gyro pilot is also designed for exerting a force on the order of that exerted by the human pilot, I find it desirable to employ additional high thrust servo motors for operating the rudders, which may be controlled either from the manual controls or the standard automatic pilot servo motor system. As shown, a separate hydraulic cylinder 1, 2, 3 is employed for each of the control surfaces, i. e., the rudder R, the elevators E and ailerons A. Each motor is shown as having piston rods 4 and 4' at each end and also slide valve rods 5 and 5' at each end. Each slide valve rod and piston rod is connected to the same cables 6, 6' leading to the control surface through individual cables 7 and 8, (7', 8') the former connected to the piston rod 4 and the latter to the slide valve rod 5. Cable 8 is shown as passing around a pulley 9 on the slide valve rod and thence to the steering pedals 10, 10', whence it passes back to the piston rod 11 on the gyro pilot servo motor 12. The other end 11' of said rod is connected to the cable 8' and back around pulley 9' on the piston rod 4'. Hence the slide valve 5, 5' and the main servo motor may be moved either from the standard manual steering control means 10, 10' or from the gyro pilot servo motor 12. When the human pilot is steering, the movement of his controls is exactly the same as if he were moving the control surfaces without the assistance of the hydraulic servo motors, since resistance may be imposed to the movement of the slide rods 5, 5', equivalent to the ordinary resistance of a control surface on a small plane. Also a follow back is provided so that the movement of the surface is at all times proportional to the movement of the control handle.

In Fig. 1, the control unit 48 of the gyro pilot is shown as connected to servo motors 12, 12' and 12" through three pairs of pipes represented in general by dotted lines 49, one pair of pipes being marked 52 and 52', and the follow-up connections from the servo motor to the control unit are shown by wires 50. Three identical control valves are in the control unit, one of which is shown in Fig. 1—A. This valve is of light construction and is shown as comprising a piston valve 51' having a valve stem 67 connected to a diaphragm 68 differentially operated from the air pick-off system on the gyroscope (not shown). Said valve is provided with suitable ports so that upon movement in one direction, oil pressure is supplied through pipe 69 to pipe 52 and the return effected through pipe 52' and back to the sump through pipe 70, and upon movement in the other direction the converse takes place, the oil being returned through pipes 71 and 70 to the sump.

The preferred construction of the servo motor unit is shown in Figs. 2, 3 and 4. In these figures, the main piston is shown at 13, the cylinder having end ports at each end at 15, entering a channel 16. In said channel is placed a bypass valve 17 operable from any suitable hand means, such as a pulley 18 operated together with the bypass valves of the other cylinders 2, 3 from common handle 65 and wires 18', so that all the servo motors may be rendered inoperative simultaneously, if desired, and the controls moved by main strength. Said passage 16 is shown as connected to the slide valve cylinder 19 through passages 20 and 20' on each side of the bypass valve 17. The slide valve proper, 21, is normally centralized by means of compression springs 22, which surround the stems 5 and 5' and bear at the outer ends against fixed abutments 23, and at the inner ends against a loose collar 24 which bears against the enlarged ends of the valve 21 and also, in the centralized position, against collar 25 formed by the reduced size of the cylinder of the slide valve as compared to the housing chamber 26 for the spring.

Oil from pump 27 (Fig. 6) is supplied through the pipe 28 to a channel 29 (Fig. 4) which lies parallel to a corresponding channel 30 connected with the exhaust pipe 31. Oil entering channel 29 passes through one or the other of ports 32, 32', shown in dotted lines in Fig. 3, and into one side or the other of the slide valve 21 when the same is moved to the right or left in Fig. 3, the oil then passing through one of passages 20 or 20' to one or the other side of piston 13 to move the same in the proper direction to turn the control surface. At the same time a return passage for the oil is provided by the uncovering of the central port 33 which connects the other pipe 20 or 20' thereto, to return the oil into the channel 30 and pipe 31 to the sump 34 (Fig. 6).

It will be understood that each of the other servo units may be similarly constructed and similarly connected to its control surface and to the manual control stick 35 and wheel 36.

The gyro pilot servo motors may be constructed as shown in Fig. 7, and as more completely described in my prior application for Safety device for airplane automatic pilot, now Patent No. 2,069,214, dated February 2, 1937. According to this construction, a common bypass valve rod 37 is provided for all three servo cylinders 12, 12' and 12'', which may be operated from the single handle 38 so that when this handle is thrown, the wires 8, 8', etc., may all be moved by hand to control the main servo motors 1, 2 and 3. Servo motors 12, 12' and 12'' are also each preferably provided with a safety valve, whereby the motors may be over-controlled by hand even though the valve 37 not be in the bypass position. As explained more fully in my aforesaid application, this safety valve is shown as a piston 40 normally held against its seat by a stiff spring 41. A central channel 42 is provided at the right of the piston and is separated from an annular channel 43 by a sleeve 44. The inner channel is in communication, through port 45, with the right hand side of a longitudinal channel 46 which is separated from the left hand side by the bypass 37, while the left hand side 46' is connected through port 47 with the annular channel 43. The piston normally closes the end of the sleeve so that there is no communication between the two channels, but in case the pilot by manual force exerts a greater pressure on the oil than normal, the piston will open and operate as a bypass to permit manual operation to over-control the automatic pilot in case of emergency.

In Figs. 5 and 6, the system is similar except that the automatic control unit 48' in this instance is shown as operating through its master or control valves the main or heavy duty servo motors. Control valves 51, 51', 51'' are connected, in this instance, to the respective servo motors through pairs of pipes 52, 52', 53, 53' and 54, 54', but only one motor 1' is shown in this instance. The servo motor may be of similar construction to that shown in Fig. 2, except that the slide valve 21' in this instance is arranged for automatic control from the valve 51' on the automatic pilot 48'. Expressed differently, the servo motor of the pilot is built into the control valve of the heavy duty motor. The valve 51' operates to direct oil through one of pipes 52 or 52' to operate the slide valve 21' which, in turn, controls the oil flow to the main piston 13'. For the preferred construction of valve 51', reference is had to Fig. 9 of the prior patent of applicant, Elmer A. Sperry, Jr., and Mortimer F. Bates, No. 1,992,970, dated March 5, 1935, for Hydropneumatic automatic pilot, but the elements of one such valve may be the same as in Fig. 1—A.

The oil from pipe 52, for instance, enters the chamber 26' to one side of the valve chamber 19'. In said chamber is a piston 55 secured to a valve stem 56 normally pressed outwardly by a compression spring 57 which bears at its inner end against a washer 58. Pipe 52 enters between said piston and washer so that when oil pressure is supplied therethrough greater than the tension of the opposing spring (not shown) on the opposite side of the valve 21', the slide valve will be moved to the left in Fig. 5. Similarly, movement to the right will occur when the pressure in the pipe 52' is superior. Collar 58 is preferably made in the form shown in Fig. 8, the body 58' thereof being of no greater diameter than the adjacent end of valve 21' and the projections bearing against collar 25, so that the effective area exposed to the oil is greater on the piston side than on the valve side. In order to aid in the prompt centralization of the valve 21' when the balanced oil valve 51' centralizes, it is found that a leak should be provided to permit a slow escape of oil from the pressure chamber behind one of pistons 55. This may be conveniently effected by very slightly opening the bypass valve 66 connecting pipes 52 and 52' or separate leaks to the sump 34 may be provided.

Obviously, valve 21' may also be operated by hand through wires 8, 8', as in the other form of the invention, to operate to control surface R through the servo motor. In such case, the bypass valve 66 is opened.

In Fig. 6 the wires leading to the manual control handles are again at 8 and 8' and the other wires are similarly numbered to Fig. 1. Also in Fig. 6, the air pump for the gyro control is shown at 60, the distributing and reducing valve at 61, and the oil reducing valve at 62.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an automatic pilot for large airplanes, a standard of position, a pneumatically operated hydraulic relay valve operated by said standard of position, a heavy duty hydraulic servo motor for operating a control surface, a slide valve for controlling the flow of liquid to and from said motor, piston means connected with said valve for moving said valve, said means being operated from the liquid controlled by said relay valve, and manually operated means for operating said slide valve directly.

2. In an automatic pilot for large aircraft, a light duty pneumatically controlled automatic pilot including a hydraulic servo motor, a direct hand control, a heavy duty hydraulic servo motor for operating a control surface of said craft and having a control valve, and connections between said first named motor and said valve, and between the hand control and said valve, and between the hand control and said surface to operate the said surface from either said first servo motor or by hand through the heavy duty servo motor, or to operate said surface directly by hand.

3. In an automatic pilot for aircraft, a standard of position, a control surface, a light duty pneumatic-hydraulic relay valve operated by said standard of position, a heavy duty hydraulic servo motor for operating said surface, a control valve therefor, means for moving the same operated from said first named valve, and hand means for also moving said heavy duty valve and for alternatively moving said control surface directly.

4. In an automatic pilot for aircraft, a standard of position, a control surface, a light duty relay valve operated by said standard of position, a heavy duty hydraulic servo motor for operating said surface, a control valve therefor, having piston means for moving the same operated from said relay valve, hand means for moving said control surface directly and means connecting said hand means and said heavy duty valve whereby said heavy duty servo motor normally assists said hand means in moving said control surface.

BERT G. CARLSON.